United States Patent [19]
Rabe

[11] Patent Number: 5,890,072
[45] Date of Patent: Mar. 30, 1999

[54] RADIOTELEPHONE HAVING A NON-RESONANT WAVE GUIDE ACOUSTICALLY COUPLED TO A MICROPHONE

[75] Inventor: Karl W. Rabe, Chapel Hill, N.C.

[73] Assignee: Ericsson, Inc.

[21] Appl. No.: 744,364

[22] Filed: Nov. 7, 1996

[51] Int. Cl.⁶ .................... H04R 1/08; H04M 9/08
[52] U.S. Cl. .................. 455/550; 455/570; 379/433; 381/338; 381/344
[58] Field of Search ............... 455/550, 569, 455/570, 90; 379/388, 420, 431, 433, 440; 181/20, 21, 22, 192, 193; 381/338, 344

[56] References Cited

U.S. PATENT DOCUMENTS

| | | | |
|---|---|---|---|
| 1,818,654 | 8/1931 | Steuart | 381/344 |
| 3,249,873 | 5/1966 | Whittmore, Jr. | 455/351 |
| 3,748,583 | 7/1973 | Andersen et al. | 455/348 |
| 4,171,734 | 10/1979 | Peveto et al. | 181/192 |
| 4,263,484 | 4/1981 | Hisatsune et al. | 381/344 |
| 4,594,478 | 6/1986 | Gumb et al. | 381/344 |
| 4,885,773 | 12/1989 | Stottlemeyer et al. | 379/420 |
| 4,926,961 | 5/1990 | Gattey et al. | 181/22 |
| 5,121,426 | 6/1992 | Baumhauer, Jr. et al. | 379/388 |
| 5,384,844 | 1/1995 | Rydbeck | 379/433 |
| 5,617,474 | 4/1997 | Ditzig et al. | 379/433 |
| 5,682,418 | 10/1997 | Ide | 455/550 |
| 5,701,354 | 12/1997 | Komoda et al. | 381/344 |

FOREIGN PATENT DOCUMENTS 0275996  7/1988  European Pat. Off. .

OTHER PUBLICATIONS

Hanna, R.C. et al, "The Function and Design of Horns for Loudspeakers", Trans. AIEE, vol. 25, No. 9, Sep. 1977, pp. 573–585.

*Primary Examiner*—Willis R. Wolfe
*Attorney, Agent, or Firm*—Rhodes, Coats, & Bennett, LLP

[57] ABSTRACT

A radiotelephone having an acoustical wave guide for channeling and directing sound energy into a microphone forming a part of the radiotelephone. The wave guide includes an elongated tube structure that varies in cross-sectional area from an inlet end to an outlet end thereof. More particularly, the wave guide is formed by a wall structure that includes portions that assume a wave configuration. This wave configuration gives rise to the varying cross-sectional area that is repeatedly found between the inlet and outlet end portions of the wave guide. This wave type configuration for the wave guide forms an acoustical low-pass filter that propagates and transmits non-resonant low frequencies in the range of 300 Hz to 3,000 Hz.

25 Claims, 5 Drawing Sheets

RADIOTELEPHONE HAVING A NON-RESONANT WAVE GUIDE ACOUSTICALLY COUPLED TO A MICROPHONE

REFERENCE TO RELATED APPLICATION

The present invention relates to a concurrently filed, co-pending application entitled RADIOTELEPHONE HAVING AN ACOUSTICAL WAVE GUIDE COUPLED TO A SPEAKER.

FIELD OF THE INVENTION

The present invention relates to radiotelephones and more particularly to a radiotelephone having a non-resonant wave guide acoustically coupled to a microphone forming a part of the radiotelephone.

BACKGROUND OF THE INVENTION

Radiotelephones typically utilize a microphone that is designed to be disposed closely adjacent the mouth of the radiotelephone user. In many radiotelephone designs, the microphone is housed within a lower flip that in an operative mode flips out from the main body of the radiotelephone, leaving the microphone in close proximity to the user's mouth. In practice, the overall quality of speech signals transmitted by the radiotelephone depend on the quality of the speech that reaches the microphone. In normal use, the distance between the microphone and the user's mouth varies. Moreover, in normal use, the radiotelephone is typically moved generally up and down and away from the mouth of the user in the course of a conversation. Therefore, the user is not always speaking directly into the microphone. In the end, speech and sound from the user's mouth is not always focused and directed sharply into the microphone and consequently, sound and speech is propagated in directions other than directly at the microphone. This of ten results in the sound pressure reaching the microphone being less than optimum and consequently, the speech reaching the microphone is not clear, distorted, and unintelligible. Thus, the speech signals routinely transmitted by some radiotelephones is less than ideal.

SUMMARY AND OBJECTS OF THE INVENTION

The present invention entails a radiotelephone having a wave guide that is acoustically coupled to a microphone housed within the radiotelephone. Speech from the user of the radiotelephone is directed into the inlet end of the wave guide and thereafter the speech is propagated down the wave guide into the inlet side of the microphone. The wave guide is elongated and includes a varying cross-sectional area from the inlet end of the wave guide to the outlet end thereof. This wave guide design yields an acoustical low-pass filter that clearly and distinctly propagates and transmits low frequencies, that is frequencies in the range of 300 Hz to 3,000 Hz, to the microphone. Moreover, the wave guide focuses and directs the sound energy directly into the microphone such that the sound pressure reaching the microphone is at a certain level that yields intelligible speech that can be transformed into clear and strong sound signals for transmission.

In one embodiment, the present invention entails a radiotelephone having a microphone and wherein the elongated wave guide is disposed adjacent the microphone for directing sound energy from the mouth of a user into the microphone. In this embodiment, the wave guide is formed by an elongated wall structure having cross-sectional area that varies in a repeating fashion between large and small cross-sectional areas along a reference axis.

The wave guide for channeling and directing sound energy into the microphone can assume various forms in the radiotelephone. A contemplated design entails the wave guide being housed within a flip structure such that the wave guide moves back and forth with the flip as the flip is moved between a position where it covers a keypad area and an operative position. In the operative position, the wave guide is disposed such that an inlet end portion thereof is open such that sound energy can be directed therein and through the wave guide housed within the flip.

It is therefore an object of the present invention to provide a radiotelephone having a wave guide incorporated therein for directing clear and intelligible speech from the radiotelephone user to a microphone incorporated within the radiotelephone.

Another object of the present invention resides in the provision of a wave guide of the character referred to above wherein the wave guide assumes a configuration that gives rise to the wave guide functioning as an acoustical low-pass filter.

A further object of the present invention is to provide a wave guide that is capable of transmitting frequencies in a non-resonant manner to a microphone housed within a radiotelephone. other objects and advantages of the present invention will become apparent and obvious from a study of the following description and the accompanying drawings which are merely illustrative of such invention.

DETAILED DESCRIPTION OF THE INVENTION

Figure 1:
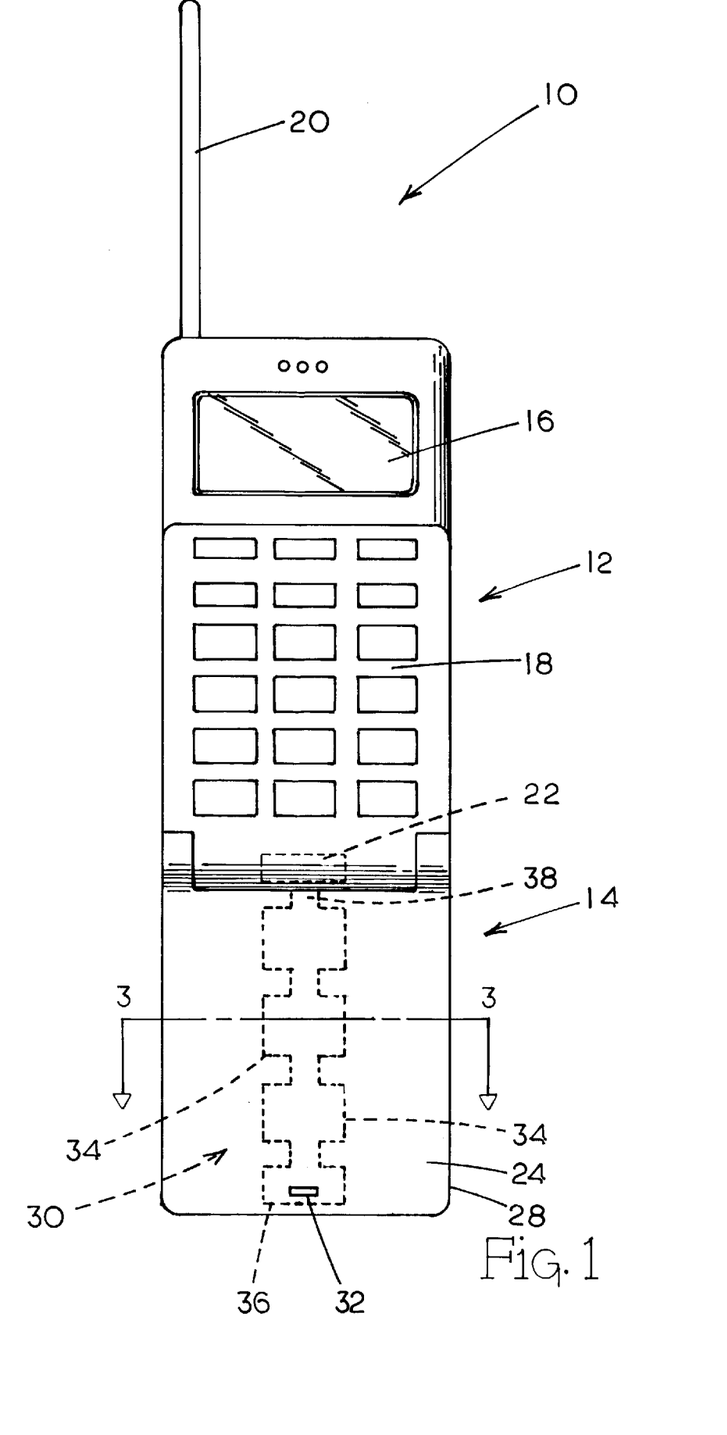
FIG. 1 is a front elevational view of a radiotelephone showing the acoustical wave guide of the present invention incorporated into a flip structure of the radiotelephone.
Figure 2:
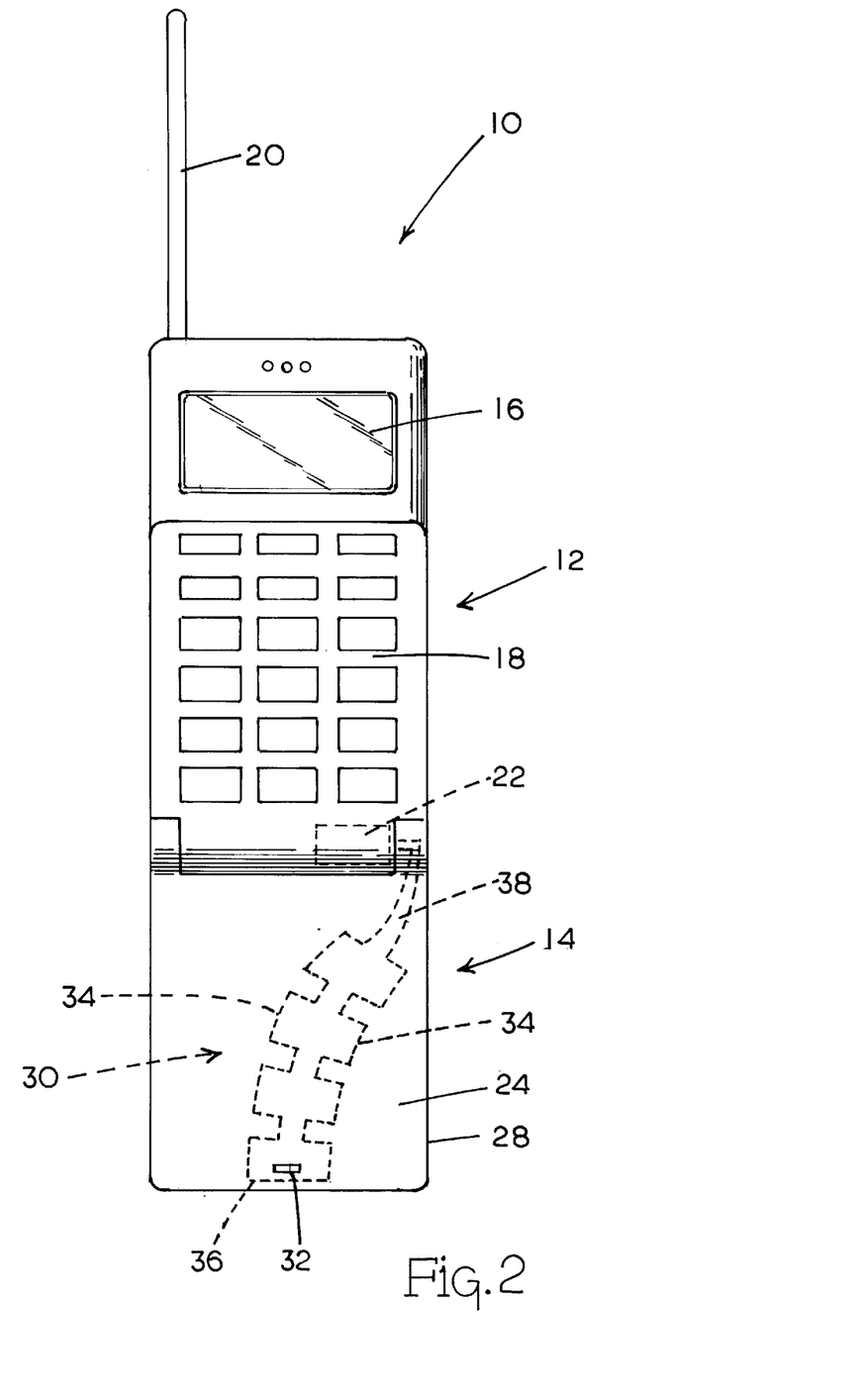
FIG. 2 is a view similar to FIG. 1 but showing a slightly different acoustical wave guide design incorporated into the radiotelephone.
Figure 3:
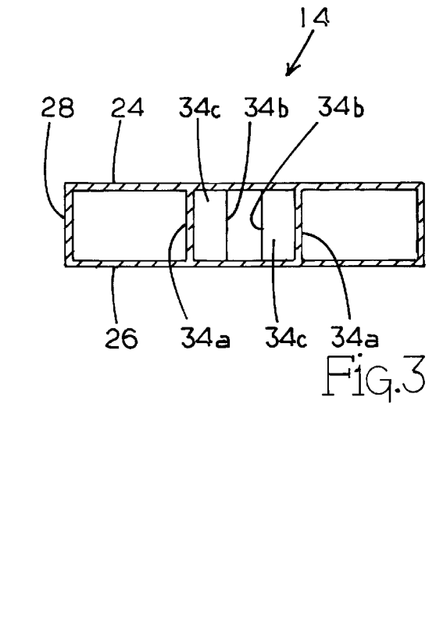
FIG. 3 is a cross-sectional view taken along the lines 3—3 of FIG. 1.

With further reference to the drawings, the radiotelephone of the present invention is shown therein and indicated generally by the numeral 10. Radiotelephone 10 includes a main body, indicated generally by the numeral 12, and a movably mounted flip indicated generally by the numeral 14. As seen in FIGS. 1 and 2, flip 14 is pivotally mounted to the lower edge of the main body 12 and is movable from a closed position where it directly overlies the front cross-sectional view taken along the lines 3—3 face of the main body 12 and an open position as shown in FIGS. 1 and 2.

Main body 12 includes a display 16 disposed over a keyboard area 18. Extending from the main body 12 is an antenna. In the case of the embodiments disclosed herein, the radiotelephone 10 includes a microphone 22 mounted internally within the lower portion of the main body 12.

Details of the radiotelephone 10 and its associated flip 14 are not dealt with herein in detail because such is not per se material to the present invention and further because the basic structure and operation of radiotelephones is well-known and appreciated by those skilled in the art. Radiotelephones of the type being referred to herein are manufactured by Ericsson Inc., of Research Triangle Park, North Carolina.

Viewing the flip 14, it is seen that the same includes a pair structure and operation of appreciated by those skilled of opposed sides 24 and 26. A surrounding edge 28 extends around the periphery of the flip 14. Defined between the sides 24 and 26 and within the surrounding edge 28 is a cavity or open area.

The present invention deals with selectively channeling sound energy or speech from a user's mouth into and through a wave guide that directs the same sound energy or speech into the adjacently disposed microphone 22. To achieve this, disposed microphone 22. To achieve this, a wave guide, indicated generally by the numeral 30, is incorporated into the flip 14. More particularly, wave guide 30 is housed within the cavity or open area defined within the flip. Note in FIGS. 1 and 2 that the wave guide is housed within the structure of the flip 14 in such a fashion that the top side 24 forms the top of the wave guide while the opposite side of the flip, side 26, forms the bottom of the wave guide.

Wave guide 30 is elongated and includes an inlet end portion and an outlet end portion. Between the inlet and outlet end portions, the wave guide varies in cross-sectional areas. That is, the cross-sectional area varies along a reference axis 40 (see FIGS. 4 and 5).

Wave guide 32 includes an inlet port 32 formed about the inlet end of the wave guide 30. As will be appreciated from subsequent portions of this disclosure, inlet port 32 serves to allow sound energy or speech from the mouth of the telephone user to be directed therethrough into the wave guide 30 itself. In addition, wave guide 30 includes a wall structure that forms a closed elongated generally airtight sound tube. Basically, the wall structure of the wave guide 30 comprises, in the case of the embodiments disclosed herein, sides 24 and 26 of the flip 14 and a pair of side walls 34. Also, as indicated in the drawings, the end of the wave guide 30 adjacent the inlet port 32 is provided with a closed end wall 36. Formed about the opposite end of the wave guide 30 is an outlet opening 38. Outlet opening 38 is disposed adjacent an inlet side of the microphone 22. Preferably, the inlet side of the microphone 22 is disposed closely adjacent the outlet end of the wave guide 30 and it is preferable that there exists a sealed generally airtight relationship around the inlet side of the microphone 22 and the outlet end of the wave guide 30. This assures that the sound energy or speech being propagated down the wave guide is directed squarely into the microphone 22.

Figure 4:
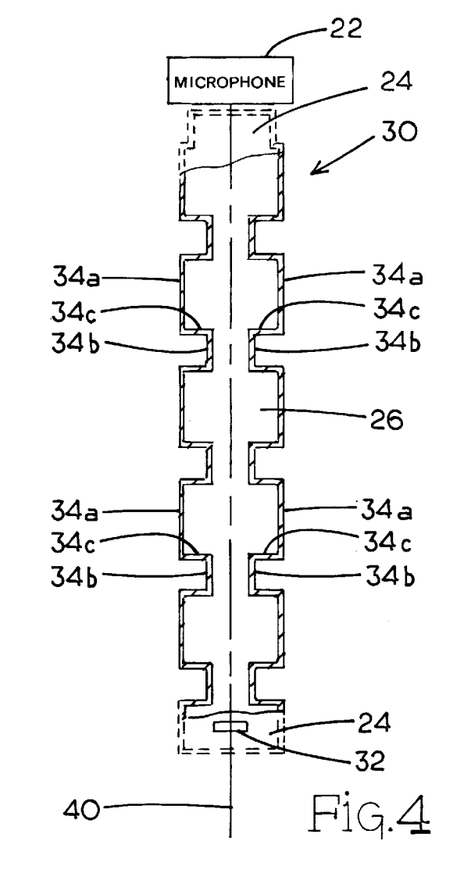
FIG. 4 is a top plan view of one embodiment of the wave guide of the present invention with the top portion thereof being broken away to better illustrate the structure of the wave guide.
Figure 5:
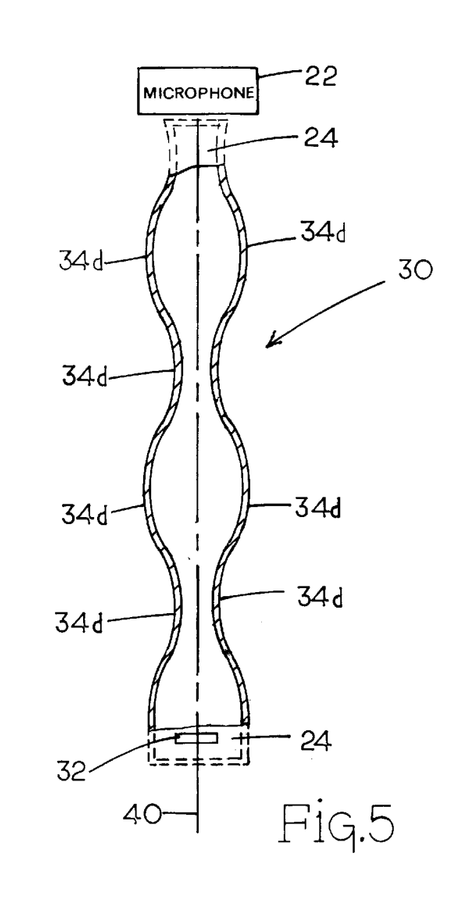
FIG. 5 is a view similar to FIG. 4 but showing a second embodiment for the acoustical wave guide of the present invention.

Wave guide 30 is disclosed herein in the form of two embodiments, the embodiment of FIG. 4 and the embodiment of FIG. 5. In both cases, it is appreciated that the cross-sectional area of the wave guide 30 varies along the reference axis 40 and between the inlet and outlet ends of the wave guide. More particularly, it is seen that in the case of both embodiments that the cross-sectional area varies between a maximum cross-sectional area and a minimum cross-sectional area. In both cases, the side wall 34 conforms to a wave configuration as it runs or extends inwardly and outwardly relative to the reference axis 40.

Turning to FIG. 4 and the embodiment of the wave guide 30 shown therein, it is seen that the cross-sectional area varies between a maximum value and a minimum value between the inlet and outlet portions of the wave guide or sound tube. In the case of this embodiment, the wave form of each of the side walls 34 is uniform and repeatable. Note in FIG. 4 where each side wall 34 includes an outer wall segment 34a. Disposed inwardly of the outer wall segment 34a is a series of inner wall segments 34b. Segments 34a and 34b are interconnected by connecting segments 34c that extend generally perpendicular relative to the reference axis 40. It is thusly appreciated that the maximum cross-sectional area occurs transversely across corresponding outer segments 34a. Likewise, minimum cross-sectional areas occur transversely across corresponding inner wall segments 34b.

Wave guide 30 shown in FIG. 4 is referred to herein as a rectangular wave form (meaning square or rectangular wave forms or wave forms that comprise in whole or part generally straight lines). As seen in FIG. 4, the respective side walls 34 generally assume a rectangular or square wave form and the corresponding wall structure formed thereby steps inwardly and outwardly in a repeating and uniform fashion. Thus, it is appreciated that sound energy being propagated down the wave guide 30 tends to be compressed as it moves through and between the inner segments 34b. After passing through each pair of opposed inner segments 34b, the same sound energy is allowed to expand into the volume defined within the bounds of a respective outer wall segment 34a.

Turning now to FIG. 5 and the second embodiment disclosed for the wave guide 30, it is seen that the wave guide formed therein is also elongated and includes a varying cross-sectional area relative to the reference axis 40. In the case of the embodiment illustrated in Figure S, the wall structure 34 on both sides of the wave guide is formed by a series of connected concave-convex segments 34d. These segments are referred to as concave-convex segments since as viewed exteriorly of the wave guide 30 the respective segments vary from concave to convex as illustrated in FIG. 5. In any event, the concave-convex segments 32d form a series of connected curved or arcuate shaped segments that give rise to a curved wave type configuration as contrasted to the rectangular or square configuration disclosed in FIG. 4. But again, the wave guide 30 disclosed in FIG. 5 includes a variable cross-sectional area due to the curved shape of the connecting segments 34d. As with the case of the embodiment shown in FIG. 4, the wave guide disclosed in FIG. 5 still includes uniform and repeating maximum and minimum cross-sectional areas.

In both embodiments, the wave form of the wall structure 34 is uniform and repeatable. While a uniform and repeatable wave form is considered preferable, such is not necessary. That is, the cross-sectional area of the wave guide may vary between any number of different cross-sectional areas. There may very well be numerous different cross-sectional areas between the inlet and outlet portions of the wave guide that may not equal either the maximum cross-sectional area or the minimum cross-sectional area.

Wave guide 30 can be incorporated into the flip 14 in any number of configurations. In FIG. 1, the wave guide 30 assumes a straight configuration and is generally aligned with microphone 22 disposed in the main body 12 of the radiotelephone 10. In the design of FIG. 2, wave guide 30 is slightly curved in order that it can be appropriately aligned and coupled with a microphone 22 through one of the flip hinge assemblies. Because the flip 14 is movable relative to the microphone 22, it is appreciated that the radiotelephone 10 would be provided with an acoustical coupler compatible with the movable flip 14 and yet provide a generally airtight seal around the interface between the microphone 22 and the outlet portion of the acoustical wave guide 30. In the embodiment of FIG. 2, the hinge assembly interposed between the microphone 22 and the outlet end of wave guide 30 can be provided with a co-axial throughway through which the output of the wave guide 30 can be channeled or directed into the input side of the speaker 22.

Figure 6:
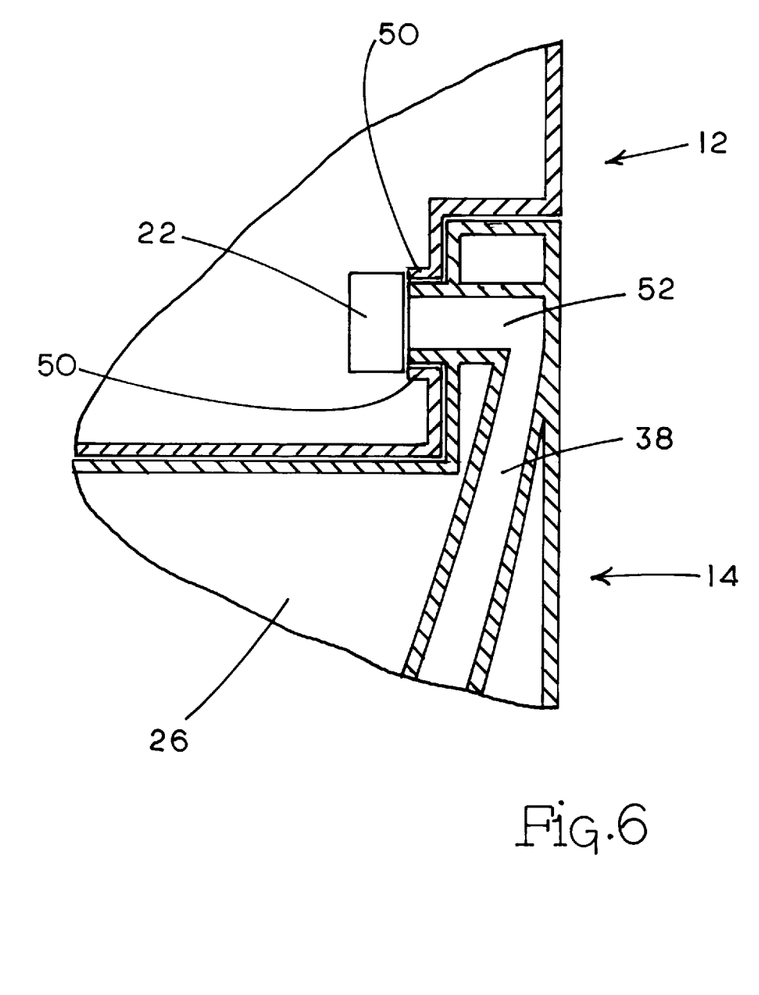
FIG. 6 is a fragmentary sectional view that illustrates a hinge type acoustical coupler for the radiotelephone design shown in FIG. 2.

In the way of an example, FIG. 6 illustrates a design where the hinge assembly that couples the flip 14 to the main body 12 also serves the function of channeling sound energy from the wave guide 30 to the microphone 22. Formed adjacent microphone 22 in the main body 12 is a wall structure that forms an insert opening. Specifically, as shown in FIG. 6, the wall structure that forms the insert opening is made up of an L-shaped wall 50 that is integrally formed in the main body 12 of the radiotelephone. The L-shaped wall 50 forms an opening adjacent the inlet side of the microphone 22. The outlet 38 of the wave guide 30 merges with a hollow pivot tube that is formed in the flip 14. The hollow pivot tube 52 is pressed into the insert opening formed by the L-shaped wall 50. A generally airtight seal is formed between the pivot tube 52 and the insert opening but yet the pivot tube 52 can freely rotate within the insert opening thereby allowing the flip to be rotated with respect to the main body 12 but at the same time allowing sound energy to be transferred from the wave guide 30 through the pivot tube 52 into the microphone 22. It should be understood that the acoustical coupling structure shown in FIG. 6 is simply an example and that there are other coupling mechanisms and designs that could be utilized to acoustically couple the wave guide 30 to the microphone 22.

Figure 7:
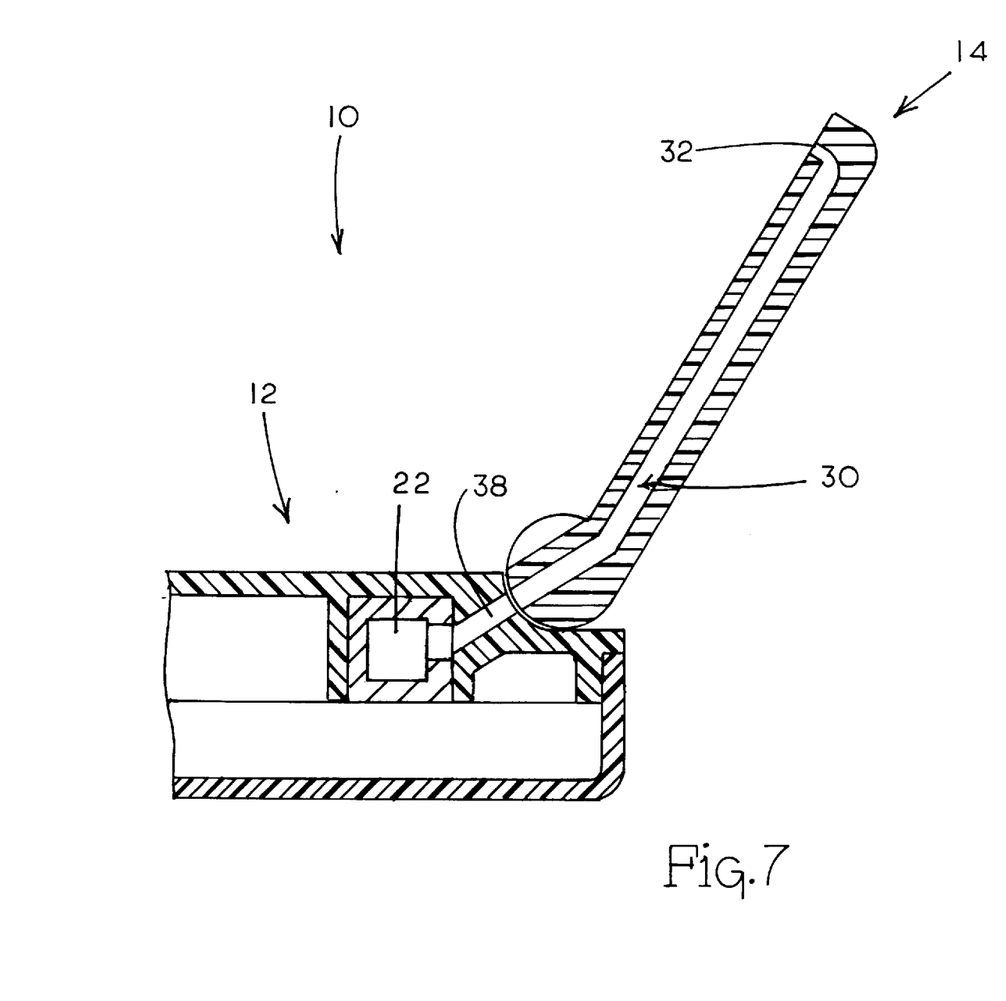
FIG. 7 is a fragmentary sectional view that illustrates acoustically coupling the wave guide housed within the flip of FIG. 1 to a microphone housed within the main body of the radiotelephone.

By utilizing a conventional detent mechanism, the flip 14 shown in FIG. 1 can be positioned into an operative or open position where the outlet of the wave guide 30 is aligned and sealed with the input side of the microphone 22. This is particularly illustrated in the schematic drawing of FIG. 7 which shows the flip 14 in an opened and operative position. Note in this position where the wave guide 30 effectively extends through the joint formed between the main body 12 and the flip 14. While various different designs can be employed, the design of FIG. 7 relies on the structural relationship between the main body 12 and flip 14 to form a relatively airtight seal when the flip 14 is rotated to the operative position of FIG. 7.

The size and dimensions of the wave guide 30 can vary. It is contemplated that the length of the wave guide 30 can vary from The size and dimensions of the wave guide 30 can vary. It is contemplated that the length of the wave guide 30 can vary from approximately ¾ inch to 4 inches. It is also contemplated that the minimum distance between the opposed side walls 34 will, in a preferred design, be in the range of approximately 1 to 2 millimeters. The widest distance between the side walls 34 is contemplated to be approximately 5 to 10 millimeters. Again, these distances and parameters can vary depending upon circumstances and conditions.

The wave guide 30 disclosed herein is designed to form a nonresonant wave guide that produces and directs clear, distinct and intelligible speech into the microphone 22 of the radiotelephone 10. Also, the basic design and configuration of the wave guide 30 forms an acoustical low-pass filter. In particular, the wave guide is designed so as to pass low frequencies, that is frequencies in the range of approximately 300 Hz to 3,000 Hz, in such a fashion as to produce a generally flat or level frequency response curve. Consequently, the design of the wave guide 30 propagates sound energy and speech down the same into the microphone 30 in such a fashion that the delivered sound energy or speech is clear, undistorted and intelligible.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A radiotelephone having an acoustical wave guide for channeling and directing sound energy into a microphone forming a part of the radiotelephone, comprising: a radiotelephone having a microphone; an elongated wave guide disposed adjacent the microphone for directing sound energy from the mouth of a user to the microphone; the wave guide including inlet and outlet portions with the outlet portion disposed adjacent the microphone such that sound energy being directed through the wave guide is directed out the outlet portion thereof into a microphone; and wherein the wave guide includes an elongated wall structure having a cross-sectional area that varies in a repeating fashion between large and small cross-sectional areas along a reference axis.

2. The radiotelephone of claim 1 wherein the cross-sectional area of the wave guide repeatedly varies between maximum and minimum values along a reference axis.

3. The radiotelephone of claim 1 wherein the wall structure of the wave guide includes at least one section that includes a series of concave-convex segments.

4. The radiotelephone of claim 1 wherein the wave guide forms an acoustical low-pass filter.

5. The radiotelephone of claim 1 including a main body and a flip movably mounted to the main body and having the wave guide disposed therein.

6. The radiotelephone of claim 5 wherein the flip includes opposed sides that form opposite sides of the wave guide.

7. The radiotelephone of claim 1 wherein the wall structure includes at least one side portion that conforms to a wave configuration.

8. The radiotelephone of claim 7 wherein at least one side portion of the wall structure assumes a generally rectangular wave configuration.

9. The radiotelephone of claim 7 wherein at least one side portion of the wall structure assumes a wave configuration formed by curved shaped segments.

10. The radiotelephone of claim 7 wherein the wave configuration of the side portion of the wall structure is generally uniform.

11. The radiotelephone of claim 7 wherein the wave configuration of the side portion of the wall structure is repeatable.

12. The radiotelephone of claim 2 wherein the wall structure of the wave guide includes at least two opposed side portions that each conform to a wave configuration that gives rise to the cross-sectional area of the wave guide varying along a reference axis.

13. The radiotelephone of claim 12 wherein the wave configuration of the opposite sides are matched and extend in an in phase relationship.

14. A radiotelephone having a wave guide for directing and channeling sound energy into a microphone associated with the channeling sound energy into a microphone associated radiotelephone, comprising:
   a) a main body;
   b) a flip movably mounted to the main body;
   c) a microphone;
   d) an elongated wave guide disposed in the flip and acoustically coupled to the microphone for directing sound energy from the mouth a user to the microphone; and
   e) the wave guide having a variable cross-sectional area along a reference axis that repeatedly varies between maximum and minimum values along the reference axis.

15. The radiotelephone of claim 14 wherein the flip includes opposite sides and wherein the opposite sides of the flip form opposite sides of the wave guide.

16. The radiotelephone of claim 14 wherein the wave guide includes a wall structure that includes two opposed side portions that each conform to wave configuration that gives rise to the cross-sectional area of the wave guide varying along a axis.

17. The radiotelephone of claim 16 wherein configuration of the opposite sides extend in an in phase relationship.

18. The radiotelephone of claim 14 wherein the cross-sectional area of the wave guide repeatedly varies between maximum and minimum values along the reference axis.

19. The radiotelephone of claim 14 wherein the wave guide includes a wall structure that includes a series of concave-convex segments.

20. The radiotelephone of claim 14 includes a wall structure that forms a configuration.

21. The radiotelephone of claim 14 wherein the wave guide at least one side portion that includes a wall structure having at least one side portion that conforms to a wave configuration.

22. The radiotelephone of claim 21 wherein the wave configuration of the side portion of the wall structure assumes a generally rectangular wave configuration.

23. The radiotelephone of claim 21 wherein at least one side portion of the wall structure assumes a wave configuration formed by curved shaped segments.

24. The radiotelephone of claim 21 wherein the wave configuration of the wall structure is generally uniform.

25. The radiotelephone of claim 21 wherein the wave configuration of the side portion of the wall structure is repeatable.

* * * * *

UNITED STATES PATENT AND TRADEMARK OFFICE
CERTIFICATE OF CORRECTION

PATENT NO. : 5,890,072
DATED : March 30, 1999
INVENTOR(S) : Karl W. Rabe

It is certified that error appears in the above-indentified patent and that said Letters Patent is hereby corrected as shown below:

TITLE PAGE, ADD THE FOLLOWING:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 4 | 4 | 1 | 6 | 7 | 8 | 7 | 1983 | Eggert et al. | | | |

FOREIGN PATENT OR PUBLISHED FOREIGN PATENT APPLICATION

| | | DOCUMENT NUMBER | | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|---|
| | 0 | 2 | 7 | 5 | 9 | 9 | 6 | A 3 | 09-1989 | Siegfried Schon and Baint Kery | | | | |
| | 0 | 4 | 9 | 6 | 2 | 3 | 5 | A 2 | 07-1992 | Hermann Constantin | | | | |
| | 0 | 4 | 9 | 6 | 2 | 3 | 5 | A 3 | 06-1993 | Hermann Constantin | | | | |
| DE | 3 | 7 | 2 | 5 | 3 | 2 6 | | A 1 | 02-1989 | Heribert Kutzer | | | | |

OTHER DOCUMENTS (Including Author, Title, Date, Pages, etc.)

Patent Abstracts of Japan, Vol. 095, No. 006, 31 July 1995

Signed and Sealed this

Twenty-sixth Day of October, 1999

Attest:

Q. TODD DICKINSON

*Attesting Officer*   *Acting Commissioner of Patents and Trademarks*